United States Patent
Gussakovsky

(10) Patent No.: US 12,467,855 B2
(45) Date of Patent: Nov. 11, 2025

(54) METHODS AND APPARATUSES FOR SPECTROPHOTOMETRIC DETERMINATION OF CONTENTS AND TURBIDITY OF A LIQUID SAMPLE

(71) Applicants: Eugene Gussakovsky, Winnipeg (CA); 6861025 Manitoba Ltd., Winnipeg (CA)

(72) Inventor: Eugene Gussakovsky, Winnipeg (CA)

(73) Assignee: 6861025 Manitoba Ltd, Winnipeg (CA)

( * ) Notice: Subject to any disclaimer, the term of this patent is extended or adjusted under 35 U.S.C. 154(b) by 1038 days.

(21) Appl. No.: 17/495,989

(22) Filed: Oct. 7, 2021

(65) Prior Publication Data

US 2022/0107265 A1 Apr. 7, 2022

Related U.S. Application Data

(60) Provisional application No. 63/088,658, filed on Oct. 7, 2020.

(51) Int. Cl.
G01N 21/31 (2006.01)
G01N 21/25 (2006.01)
G01N 21/3577 (2014.01)

(52) U.S. Cl.
CPC ....... *G01N 21/3103* (2013.01); *G01N 21/255* (2013.01); *G01N 21/3577* (2013.01)

(58) Field of Classification Search
CPC ............ G01N 21/3103; G01N 21/255; G01N 21/3577; G01N 21/5907
See application file for complete search history.

(56) References Cited

U.S. PATENT DOCUMENTS

2011/0263031 A1* 10/2011 Gomes ................. G01N 33/721
436/66

* cited by examiner

*Primary Examiner* — Lyle Alexander
*Assistant Examiner* — Dwan A Gerido
(74) *Attorney, Agent, or Firm* — Kyle R Satterthwaite; Ryan W Dupuis; Ade & Company Inc.

(57) ABSTRACT

A method for determining contents of sample liquids spectrometrically includes an empty-state measurement with no liquid present, to obtain an empty-state light intensity measurement $I_e$. A liquid-blank measurement is then taken of a pure unmixed volume of said liquid component, to obtain a liquid-blank light intensity measurement $I_w$. A sample measurement of the sample liquid is then taken to obtain a sample light intensity measurement $I_s$. Using $I_e$, $I_w$, and $I_s$, determination is made of a volume concentration of a liquid component [H2O] in the sample liquid, and a liquid-corrected light intensity measurement $I_{wc}$. From $I_s$, $I_{wc}$ and a known length of the light path, a volume concentration of alcohol [Alc] is calculated. From [H2O] and [Alc], a remnant volume concentration attributable to other constituents is determined, from which a carbohydrate concentration [Carb] is calculated using a predetermined carbohydrate coefficient. Provisions for turbidity determination and light scatter correction are included.

8 Claims, 7 Drawing Sheets

METHODS AND APPARATUSES FOR SPECTROPHOTOMETRIC DETERMINATION OF CONTENTS AND TURBIDITY OF A LIQUID SAMPLE

CROSS-REFERENCE TO RELATED APPLICATIONS

This application claims benefit under 35 U.S.C. 119(e) of U.S. Provisional Application No. 63/088,658, filed Oct. 7, 2020, the entirety of which is incorporated herein by reference.

FIELD OF THE INVENTION

The present invention relates generally to spectrophotometric determination of chemical components and turbidity in water-containing liquids.

BACKGROUND

Spectrophotometric determination of chemical components in liquids is based on Beer-Lambert law (BLL). Analyte concentration (C) can be found from the equation $C=A/(\varepsilon*L)$ where A is light absorption, $\varepsilon$ is extinction coefficient specific for the analyte, L is light pathlength though out the solution. Here, $A=-Log_{10}(I/I_0)$ where I is an intensity of light passed through a solution, and $I_0$ is an intensity of light passed though a solvent of the solution. Both A and $\varepsilon$ are light wavelength dependent. BLL can be applied if A<1.5 at the small concentration C of analyte. Analyte should not change the volume of solvent.

Principles employed by various apparatuses used for optical-spectroscopic analysis include 1) Fourier-Transform Infrared Spectroscopy (FTIR), in which a high-resolved infrared spectroscopy of a sample is attained and compared with spectra from a database; 2) Photometry at selected number of light wavelengths; 3) Standard UV-Vis-NIR spectrophotometry using web application for processing the raw data spectra; and 4) use of fiber optics for transparent spectrophotometry (see refs. 1-3,5,17,29,31, 34-36).

Methods for processing the optical light absorbance spectra of liquids include 1) standard direct spectrophotometry; 2) First and second derivative of light absorbance spectra; and 3) Multivariant analysis (see refs. 17, 31-36).

In the prior art, there are several known techniques for determining content of particular analytes in liquids, briefly summarized as follows.

Water Content Determination (See Refs. 8-10, 16)
1) The Karl-Fischer titration method provides water content in liquids containing less then 40% v/v (volume per volume) of water, and requires use of chemical reagents. For liquids of more than 40% v/v water, the water content should be quantitively reduced to <40% using specific chemicals. The methodology involves running of a particular chemical reaction, and can be performed with a volumetric or coulometric approach. Detection methods include visual or photometric indication, and electrometric indication; no spectrophotometric indication is employed. The results may be affected by multiple side chemical reactions. Sample preparation techniques include dilution, solvent extraction, homogenization, and heating. The method and apparatus cannot be used for chemical components other than water content.
2) The OILAN A4 by Kytola Instruments is useful to determine water content specifically in oils. The water content cannot exceed 5,000 ppm (0.5% v/v), the apparatus is designed to test water content online in oil piping.

Alcohol Content Determination (See Refs. 1, 3, 5, 7, 11-13, 17-24, 29, 31-34)
1) There are several direct methods for determination of alcohol content, including the NIR spectroscopy and spectrophotometry, FTIR spectroscopy, fluorescent spectroscopy using a fluorescent agent in solvent, gas chromatography (GC), high-performance liquid chromatography (HPLC), distillation, ebuliometry, and chemical methods such as enzymatic determination and dichromatic oxidation.
2) Indirect methods for determination of alcohol consent include hydrometry and densitometry.

Carbohydrate Content Determination (See Refs. 14-16, 27, 28, 36)
1) Optical methods for determining carbohydrate content include polarography (optical rotation) and refractometry.
2) Chemical methods for determining carbohydrate content include colorimetry/spectrophotometry of reaction products formed with specific reagents, reductometric determination, and Enzymatic determination.
3) High-performance liquid chromatography (HPLC)

In general, the prior art techniques for determining analyte content in liquids suffer from one or more of the following shortcomings: requiring separate distinct test procedures for different analyte in the same liquid, and/or requiring specialized equipment and/or specialized personnel knowledgeable on the scientific principles underlying the procedure.

For example, in the context of the alcoholic beverage industry, a brewery, winery or distillery with a need to assess the alcohol and carbohydrate content in their beer, wine, or liquor product, either needs to send out samples of the product to an outside testing party with specialized equipment and knowledgeable staff, thus introducing the inefficiencies of sample transport and potential testing and reporting backlogs; or needs to invest in costly in-house equipment and knowledgeable in-house testing personnel, the costs of which are typically unaffordable for small independent producers.

Turbidity Determination (See Refs. 39-42)

Turbidity in beer is also a key quality parameter. There is no international standard for the analysis. Previously turbidity has been determined visually, microscopically or measuring the scattering of the light (nephelometry) at various angles in respect to incident light beam (90° as the most popular, 25° 13°, others). There are a few specific instruments (turbidimeters, nephelometers) made available by various companies (Hach, Hanna Instruments, ThermoFisher Scientific, Mettler Toledo, and others) that enable the turbidity determination. American Society of Brewing Chemists (ASBC) recommended Formazin as a turbidity calibration standard of various Formazin Turbidity Units (FTU). Various content of Formazin in suspension can be prepared by dilution of concentrated Formazin suspension by deionized water (18 MO resistivity or greater). For example, the initial suspension of 4000 FTU being diluted 1/100 results in the Formazin standard of 40 FTU.

Light Scattering (See Ref. 43)

Rayleigh scattering of light (see ref. 43) provides an option to determine the turbidity at 0° or 180°. In the most general form, the scattered light intensity "I" depends on the wavelength $\lambda$ of the incident light beam $I=k/\lambda^n$. In the light absorption notation, $OD=log_{10} I=log_{10} k - n \times log_{10}\lambda$. Here, OD, is optical density determined by reduction of the reflected light because the light scattering mimicking the light absorption. Parameters k and n are determined by properties of particles scattering the light. Different samples have different parameters of k and n which should be found in each case.

Sample Preparation (See Ref. 44)

Sample preparation is an essential part of the instrumental liquid assay. ASBC defines how the beer sample should be prepared before being analysed. It includes the degassing, decarbonation, filtration, centrifugation, aseptic procedures that require specific chemical reagents, apparatuses and a time of 5-40 min per sample.

In view of the shortcomings of the prior art techniques, there remains a need for improved techniques for determining the content and turbidity of water-containing liquids, particularly techniques than be performed in house on an affordable basis.

SUMMARY OF THE INVENTION

According to one aspect of the invention, there is provided a testing method for determining contents of sample liquids, said method comprising:
  (a) obtaining a sample liquid composed of multiple substances, at least one of which is a liquid component whose concentration is to be measured;
  (b) using a sample testing apparatus that comprises a light source for transmitting light through said sample liquid on a light path of known length therethrough; and a spectrometer operable to measure an intensity of the light after travel thereof through said light path, performing the following steps:
    (i) an empty-state measurement step comprising transmission of light from said light source through said light path while said light path is in a void state free of any liquid substance, and measurement of the intensity of said light by the spectrometer after travel of said light through said light path while in the void state, thereby obtaining an empty-state light intensity measurement ($I_e$);
    (ii) a liquid-blank measurement step comprising transmission of light from said light source through said light path while said light path is in a liquid-filled state occupied solely by a pure unmixed volume of said liquid component, and measurement of the intensity of said light by the spectrometer after travel of said light through said light path while in the liquid-filled state, thereby obtaining a liquid-blank light intensity measurement ($I_w$);
    (iii) a sample measurement step during which said sample liquid occupies said light path, said sample measurement step comprising transmission of light from said light source through said sample liquid on said light path, and measurement of the intensity of said light by the spectrometer after travel through said sample liquid, thereby obtaining a sample light intensity measurement ($I_s$);
  (c) using said empty-state light intensity ($I_e$), said liquid-blank light intensity ($I_w$), and said sample light intensity $I_s$, calculating a volume concentration of the liquid component ([H2O]) in said sample liquid, and a liquid-corrected light intensity measurement ($I_{wc}$).

In one embodiment, said liquid component is water and the liquid-blank measurement step (b)(ii) is performed on pure water, whereby the liquid-blank light intensity measurement ($I_{wc}$) is a water-blank light intensity measurement, the liquid-corrected light intensity measurement ($I_{wc}$) is a water-corrected light intensity measurement and said volume concentration of the liquid component is a volume concentration of water.

In such instance, said multiple substances may further comprise alcohol, in which case the method preferably further comprises: (d) using said sample light intensity measurement ($I_s$), said water-corrected light intensity measurement ($I_{wc}$), and said known length of the light path, calculating a volume concentration of alcohol ([Alc]) in said sample liquid.

Said multiple substances may further comprise carbohydrate, in which case the method preferably further comprises:
  (e) using said volume concentration of water ([H2O]) and said volume concentration of alcohol ([Alc]), calculating a remnant volume concentration attributable to constituents of the sample liquid other than said water and said alcohol; and
  (f) using said remnant volume concentration and a predetermined carbohydrate coefficient, calculating a carbohydrate concentration ([Carb]) of the sample liquid.

The method may also comprise, subsequent to step (c), using said empty-state light intensity measurement ($I_e$) and said liquid-corrected light intensity measurement ($I_{wc}$) to calculate a color measurement of the sample liquid.

Preferably, for the purpose of automating the calculations:
  step (b)(i) further comprises storage of said empty-state light intensity measurement ($I_e$) on a non-transitory computer readable medium;
  step (b)(ii) further comprises storage of said liquid-blank light intensity measurement ($I_w$) on said non-transitory computer readable medium;
  step (b)(iii) further comprises storage of said sample light intensity measurement ($I_s$) on said non-transitory computer readable medium; and
  step (c), and steps (d) through (f) if included, are performed by a processor that is connected to said non-transitory computer readable medium to retrieve data therefrom, and that executes statements and instructions that are stored on a same or different non-transitory computer readable medium and that are configured to cause said processor to perform said steps (c) through (f).

According to another aspect of the invention, there is provided a system for carrying out the forgoing testing method, said system comprising:
  one or more computing devices that comprise one or more computer processors;
  a spectrometer connectable or connected to one of said one or more computing devices and operable to transmit spectral data thereto for analysis of said spectral data thereby; and
  one or more computer readable media on which there are stored statements and instructions executable by the one or more computer processors to perform at least step (c), and preferably steps (d) through (f) if included, of the forgoing testing method.

Preferably the testing apparatus comprises a dip probe that is optically coupled to both the light source and the spectrometer, said dip probe comprising a submersible probe body that is placeable into a working position at least partially submerged in a sample liquid, said probe body having a hollow cavity into which the sample liquid is admitted when said probe body is submerged therein, said probe body supporting a light reflector adjacent a distal bottom end of the cavity and an optical lens adjacent an opposing proximal top end of the cavity, whereby incident light from the light source is transmitted across the hollow cavity from the proximal top end to the distal bottom end, and is reflected by the light reflector back across the hollow cavity to the proximal end thereof and optically communicated therefrom to the spectrometer, and the known length of the light path is equal to twice a length of the hollow cavity, as measured between the proximal top end and the distal bottom end thereof.

The method may include determining a turbidity of the sample liquid by:
calculating a pure-water optical density ($OD_0$) using the liquid-blank light intensity measurement ($I_w$) and the empty-state light intensity measurement ($I_e$);
calculating a sample optical density ($OD_s$) using the sample light intensity measurement ($I_s$) and the empty-state light intensity measurement ($I_e$);
converting the pure-water optical density ($OD_0$) and sample optical density ($OD_s$) to logarithmic wavelength scale, and calculating at least one of either a slope difference ($\Delta$ Slope) and an intersection difference ($\Delta$ Int) between plots of the pure-water optical density ($OD_0$) and the sample optical density ($OD_s$) in said logarithmic wavelength scale and in a pre-defined wavelength range (WLR) in which optical density is attributable to light scattering; and
calculating turbidity of the sample liquid using results of a calibration procedure together with either said slope difference ($\Delta$ Slope) or said intersection difference ($\Delta$ Int).

Step (c) preferably comprises deriving a pure-water optical density spectrum plot ($A_{we}$) in a predefined wavelength range WLR in which optical density is attributable to light scattering, calculating a slope ($SLP_{we}$) and intercept ($INT_{we}$) of said pure-water optical density spectrum plot, calculating a corrected pure-water optical density spectrum ($OD_{we-corr}$), where $OD_{we-corr}(\lambda)=A_{we}(\lambda)-(SLP_{we}\times\lambda+INT_{we})$, and calculating the volume concentration of water [H2O], where $[H2O]=100\times A_{se}(\lambda)/OD_{we-corr}(\lambda)$, or $[H2O]=100\times A'_{se}(\lambda)/OD'_{we-corr}(\lambda)$, and $A_{se}(\lambda)=-\log_{10}\{I_s(\lambda)/I_e(\lambda)\}$.

Step (d) preferably comprises deriving a sample optical density spectrum plot ($A_{sw}$) a predefined wavelength range WLR in which optical density is attributable to light scattering, calculating a slope ($SLP_{sw}$) and intercept ($INT_{sw}$) of said sample optical density spectrum plot, calculating a corrected sample optical density spectrum ($OD_{sw-corr}$), where $OD_{sw-corr}(\lambda)=A_{sw}(\lambda)-(SLP_{sw}\times\lambda+INT_{sw})$, and calculating the volume concentration of alcohol [Alc], where $[Alc]=dOD_{sw-corr}(\lambda)/\{d\varepsilon(\lambda_0)*L\}$, or $[Alc]=OD_{sw-corr}(\lambda)/\{\varepsilon(\lambda_0)*L\}$, and $\varepsilon$ is a calibration-derived extinction coefficient of alcohol.

According to yet another aspect of the invention, there is provided calibration method for ensuring accurate results from the forgoing testing method for determining water, alcohol and carbohydrate content of sample liquids, said calibration method comprising:
obtaining a standardized set of different model liquids each having known actual concentrations of water, alcohol and carbohydrate content and among whose relative proportions of water and alcohol are varied;
for each of said different model liquids in said standardize set:
executing steps (b)(i) through (b)(iii) and (c) through (f) of the forgoing testing method for determining water, alcohol and carbohydrate content; and
performing comparison of the calculated volume concentration of water [H2O] from step (c), the calculated volume concentration of alcohol [Alc] from step (d) and the calculated carbohydrate concentration [Carb] from step (f) against the known actual concentrations of water, alcohol and carbohydrate content of the model liquid; and
based on said comparison, deriving one or more correction factors to be used for the purpose of updating one or more calculation formulas that are used among steps (c), (d) and (f).

When calibrating for beer, the model liquids may each be composed of an equal predetermined volume of non-alcoholic beer, and to which one or both of water and alcohol are added in different proportions, but equal collective volume, for the different model liquids.

When calibrating for wine, the model liquids may each be composed of an equal predetermined volume of non-alcoholic wine, and to which one or both of water and alcohol are added in different proportions, but equal combined volume, for the different model liquids.

When calibrating for clear distilled liquor, the model liquids may each be composed of an equal volume of uncolored water, and to which one or both of alcohol and additional water are added in different proportions, but equal combined volume, for the different model liquids.

When calibrating for dark distilled liquor, the model liquids may each be composed of an equal volume of dye-colored water, and to which one or both of alcohol and additional water are added in different proportions, but equal combined volume, for the different model liquids.

Preferably the calibration method includes updating said calculation formulas, and storing said updated formulas in one or more computer readable media as part of a software program composed of statements and instructions executable by one or more computer processors to perform steps (c) through (f) of the testing method.

BRIEF DESCRIPTION OF THE DRAWINGS

A preferred embodiment of the invention will now be described in conjunction with the accompanying drawings in which.

DETAILED DESCRIPTION

Testing Apparatus

Figure 1:
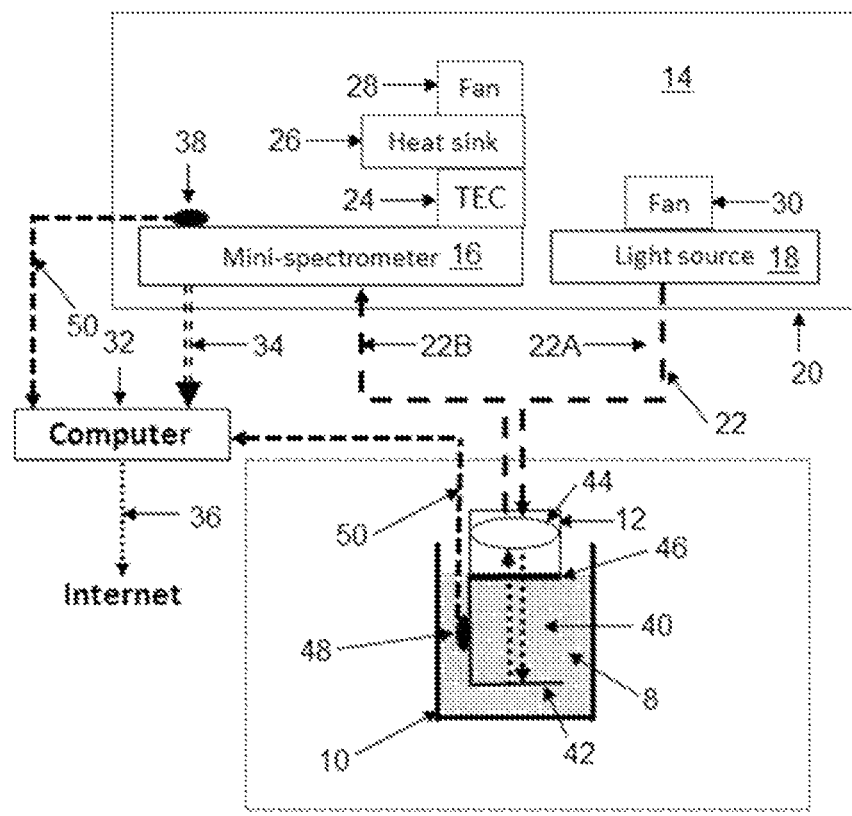
FIG. 1 is a schematic illustration of a sample testing apparatus for spectrophotometric determination of water, alcohol and carbohydrate content in alcoholic beverages or other water-containing liquids.

FIG. 1 illustrates one embodiment of a novel sample testing apparatus for use in a novel method for determining water, alcohol and carbohydrate content, and optionally color, of a water-containing sample liquid 8. The apparatus includes an open-top container 10 comprising an interior space for holding a water-containing sample liquid, a dip probe 12 insertable into the container 10 through the open top thereof for partial submersion into the sample liquid, and a spectrometry device 14 that includes a spectrometer 16, a light source 18 and associated electronic cooling componentry, preferably all housed together in a shared housing 20. The light source 18 is operable emit light the ultraviolet/visible/near-infrared (UV-Vis-NIR) region of the electromagnetic spectrum, and is optically coupled to the dip probe 12 via a source leg 22A of a fiber optic Y-cable 22, whose spectrometer leg 22B is optically coupled between the dip probe 12 and the spectrometer 16. The electronic cooling componentry comprises a thermoelectric cooler (TEC) 24 whose cold side is thermally coupled to the spectrometer 16 to extract heat therefrom, and whose hot side is thermally coupled to a heat sink 26 to transfer the extracted thereto. The heat sink has a first cooling fan 28 installed thereon to dissipate heat from the heat sink. A second cooling fan 30 is installed in operable relation to the light source 18 to likewise dissipate generated heat therefrom.

The spectrometer 16 of the device 14 is connectable to a general-purpose computer 32 (e.g. desktop, laptop, tablet, smartphone, etc.), for example by way of a USB cable 34 or other suitable connector, so that output data from the spectrometer 16 can be received by a software program executed by one or more processors of the computer. Optionally, the spectrometer may be a mini-spectrometer with a 5V DC operating volage, whereby the same USB cable 34 used for data communication can also be used to power the spectrometer. The light source 18 and powered cooling components (TEC 24, fans 28, 30) may have a different operating voltage, e.g. 12V DC, and can be powered from a mains power outlet via a suitable AC/DC adapter.

The software program is embodied by statements and instruction stored in one or more non-transitory computer readable media of the computer and executable by the one or more processors thereof. The spectral data from the spectrometer 16, and resultant data computed on the basis thereof by the software program, may be stored on the same or a different non-transitory computer readable media than that on which the software is stored. The computer 32 preferably has a network connection 36 to the internet or other wide area network to allow resultant data to also be transmitted to a remote centralized or cloud server for the purpose of both backing up test results, and enabling convenient remote access thereto from any computer, smartphone or other internet-capable device, whether through a web-based interface or dedicated application installed on such devices.

The device 14 may include a temperature sensor 38 (e.g. thermistor) installed on a body of the spectrometer 16 and connected to the computer 32 for continual monitoring of the spectrometers operating temperature by the software program. The software program may be configured to only to permit execution of a calibration or test procedure if the monitored operating temperature of the spectrometer 16 is within a predetermined operating range, as normally maintained by the TEC 24 and connected cooling fan 28. Additionally, or alternatively, the software program may continually display the operating temperature of the spectrometer 16 on a display screen of the computer for user-confirmation that the operating temperature is within range.

Additionally, or alternatively, the device 14 may contain a dedicated microcontroller therein, whose functionality could include direct monitoring of the spectrometer's operating temperature, and switching a status indicator on the device 14 into an alarm mode in the event the temperature is outside the predetermined operating range. For example, the device 14 may have a visual status indicator composed of one or more colored light-emitting diodes (LEDs), for example a red LED activated in such alarm instances, and optionally an accompanying green LED that remains on in all other instances to indicate acceptable operating conditions. While the device 14 in illustrated embodiment is embodied as a peripheral device relying on connection to an external general purpose computer 32 to run the necessary software program to log the spectrometer's output data and perform various calculations therewith to derive useful resultant data, it will be appreciated that in other embodiments the device 14 may be embodied as a stand-alone device having its own processor and computer readable memory for local execution of the software program on the device itself to log the spectrometer's output data, and optionally process said data to locally derive and store the resultant data.

The open-top sample holding container 10 is used to hold a test sample of a water-containing sample liquid. The dip probe 12 is optically coupled to both the light source and the spectrometer, and has a submersible probe body that is lowerable into the open top container 10 into the illustrated working position partially submerged in the sample liquid.

As shown, the probe body has a hollow cavity 40 into which the sample liquid is admitted when submerged. The probe body has a light reflector 42 positioned adjacent a distal bottom end of the cavity in an upward facing orientation, and an optical lens 44 supported adjacent to an opposing proximal top end of the cavity at a position above and outside the cavity 40. The cavity, at the top end thereof, is bound by a transparent shield 46 formed by a piece of glass or other optically transparent material. This glass shield 46 isolates the optical lens 44 from the sample liquid, and protects the optical properties of the lens 44. The glass shield 46 and the reflector 42 lie parallel to one another and are spaced apart from one another along a reference axis that lies perpendicular to their respective planes. The axial distance between glass 46 and the reflector 42 denotes one half of a fixed-length light path on which light will travel back and forth across the cavity's admitted volume of sample liquid.

The optical lens 44 compensates the fiber optics numerical aperture to collimate the incident light received through the source leg 22A of the optical fiber Y-cable 22, thereby forming parallel light beams that are introduced into the cavity-admitted volume of the sample liquid through the glass shield 46. The Incident light from the light source 18 is thus transmitted across the cavity 40 from the lens 44 and glass shield 46 situated at the proximal top end of the cavity 40 to the reflector 42 situated at the distal bottom end of the cavity. Here, the incident light is reflected back across the cavity 40, and back through the glass shield 26 and lens 44 at the proximal end of the cavity 40, from which the reflected light is optically communicated onward to the entrance slit of the spectrometer 16 via the spectrometer leg 22B of the fiber optic Y-cable 22. The length of the light path travelled through the sample liquid is thus double the axial length of the probe body's hollow cavity 40, as measured between the glass shield 46 and the reflector 42 situated at opposite ends of the cavity 40.

The dip probe 12 preferably includes a sample temperature sensor 48 (e.g. thermistor), which resides at a location on the probe body that is submerged in the sample liquid 8 when the probe 12 is placed in the working position, whereby the sensor 48 is operable to measure the temperature of the sample liquid. In the illustrated example, the sample temperature sensor 48 is positioned on an exterior of sidewall of the cavity 40 that also serves as the support by which the reflector 42 is carried at the distal bottom end of the cavity 40. To minimize influence of the probe body temperature on the measured sample temperature, the sample temperature sensor 48 is attached to the probe body by means of a waterproofed thermo-isolating layer. Like the spectrometer temperature sensor 38, the sample temperature sensor 48 is connected to the computer by a suitable signal cable 50 to send temperature measurement signals thereto for use by the software program. Sample temperature affects the physico-chemical properties of the water-containing liquid and then the quantitation of the analyte content. The measured sample temperature is logged with the scanned spectral data from each sample, and is used in the data analysis in a known manner to account for temperature dependent variations, for example temperature dependent variation in the density of water and alcohol.

Operation of the device 14 and connected dip probe 12 during any measurement procedure is generally summarized as follows. Light from light source 18 is optically transmitted to dip probe 12 via the source leg 22A of the fiber optic Y-cable 22. At the spectrometer 16, the reflected light from the dip probe 12 generates a specific electrical output signal, which is communicated to the computer 32 via the USB cable 34. Meanwhile, an output signal from the spectrometer temperatures sensor 38 communicates the temperature of the spectrometer to the computer 32 via a signal cable 50, which may be embodied by another USB cable, and like the spectrometer's USB cable, may be directly connected to the computer 32, or via a shared USB hub. If a thermistor or other analogue temperature sensor is used, the output signal is of course first routed through a suitable analog-to-digital converter to obtain a digital signal recognizable to the computer. The thermoelectric cooler 24 provides stability to the output spectral signals from the spectrometer 16, while the spectrometer temperature sensor 38 serves to report the monitored temperature stability to the computer 32. Meanwhile, the second cooling fan 30 dissipates lamp heat from the light source 18 to contribute to a stable operating temperature of the device 14. The software program receives and processes the output spectral signals from the spectrometer 16 according a programmed algorithm for converting the spectral signals to sample component content values, in conventional units, for particular components (water, alcohol, carbohydrate) of the sample liquid. Files containing the resultant sample component content values are generated, and may be stored in security-enforced fashion, e.g. under username and password protection, and may be viewed on screen, downloaded to another device, printed out, remotely retrieved, or used in other ways by authorized personnel who have been granted secured access to the software program and stored files.

Test Methodology

A testing method performed with the foregoing apparatus to determine water content [H2O], alcohol content [Alc] and carbohydrate content [Carb] is based on the application of the Beer-Lambert Law for water-containing liquids in the which the analytes occupy a significant amount of the sample liquids overall volume. The method is effective to determine alcohol content [Alc] when present in a concentration of at least 0.5% v/v, and to determine carbohydrate content when the carbohydrates are present in an amount that contributes to the sample volume by 0.5% or more. The testing method can also provide a determination of color, for example according to the Standard Reference Method (SRM) or European Brewery Convention (EBC). The detailed, but non-limiting, example set forth in the description and drawings herein includes determination of water, alcohol and carbohydrate content in a beer sample, as well as determination of beer color in SRM or EBC units.

Basic Scanning Procedure

For any steps in the testing method described below that requires a spectroscopic scan of the contents of the sample container (whether those contents are air, pure water, or a water-containing sample liquid), the following basis scanning procedure is followed:

1) Apparatus Setup
   a) If not already powered up and running for a sufficient warmup period of predetermined duration (e.g. 1 hour), the spectroscopic device 14 is powered on and allowed to run for such a warmup period to ensure the spectrometer has reached a stable operating temperature within the predetermined operating temperature range.
   b) The dip probe is washed with distilled water, and allowed to dry.
   c) If not already setup, a uniquely named folder is created on the computer as the intended storage destination for the resultant data files of the particular test or calibration being conducted, and in the software program, is selected as a destination folder for such resultant data files.

d) Any necessary steps for setup of the spectrometer before use are performed, for example accordingly to instructional steps displayed on the computer display by the software program.

2) Scanning of Container Contents
   a) For a water-containing sample liquid, the sample liquid is filtered and degassed to achieve a clear transparent bubble-free state appropriate for scanning, prior to which non-transparency of the sample liquid may be attributable to gas content, extra-turbidity, etc.
   b) The bubble-free sample liquid is transferred to the sample container 10.
   c) The dip probe 12 is lowered into the contents of the sample container 10 through the open top thereof, into a working position sufficiently submerged into the container contents so as to fully immerse the hollow cavity of the dip probe into the container contents, whereupon the hollow cavity of the dip probe is filled by the container contents.
   d) Where the container contents are liquid, before initiating a spectroscopic scan, the user visually inspects the container contents to ensure a lack of bubbles therein.
   e) A spectroscopic scan is initiated, for example by selecting an onscreen "scan" option displayed on the computer display by the software program, whereupon the software program commands the spectrometer to initiate spectra acquisition.
   f) In response, the spectrometer performs such acquisition, and sends the resulting spectral data back to the computer for logging by the software program, which saves the logged spectral data in a uniquely named file in the assigned destination folder.
   g) The dip probe is washed with distilled water, and allowed to dry.

As outlined in more detail below, before any sample liquid can be scanned for the purpose of spectrometrically determining contents of the sample liquid, the scanning procedure above (steps 2a-2d) must first be performed with the container in an empty state devoid of liquid (i.e. scanning the container while its only contents are ambient air), and then repeated with the container in a water-filled state containing only pure water. The scanning procedure can then be repeated one or more additional times for a respective one or more sample liquids whose contents are to be determined. When testing a batch of different sample liquids, a different destination folder may be created/assigned for each sample, or the same destination folder may be used for all sample liquids in that batch (e.g. in a folder named by date), provided that unique file names are used to store the logged spectral data from the different samples.

Once scanning of all samples to be tested has been completed through sufficient repetition of the scanning procedure steps 2a-2d, the user then initiates an automated computer analysis of the logged spectral data by the software program according to a stored data analyzing algorithm thereof, for example by selecting an "analyze" option in the user interface of the software program, through which they can navigate the stored spectral data log files and pick which one or more thereof to run through the analytical algorithm. For each selected log file, the program retrieves the stored spectral data and inputs same to the analytical algorithm. Via the calculations described herein further below, the algorithm calculates the water content [H2O], alcohol content [Alc] and carbohydrate content [Carb] of the sample liquid whose spectral data was analyzed, and optionally also calculates a color value of that sample liquid, and stores this resultant data in a uniquely named test results file, whether in the same destination folder in which the given spectral data was previously stored or in another user specified folder, for later retrieval and viewing. The program may optionally display the resultant data on the computer display screen upon completion of the data analysis, whether such display is performed by default, or only in response to a user-selectable option presented through the software program's user interface, either after completion of the analysis, or earlier on as during selection of the particular spectral log file(s) to analyze.

Data Analysis

In brief, the algorithm conducts the following sequential analyses:
1) Water content [H2O] is determined in % v/v units
2) A water-content corrected blank is determined
3) Alcohol content [Alc] in % v/v units is measured by light absorption versus the corrected blank after color compensation.
4) Color in SRM or EBC units is determined using the water-corrected blank
5) The SRM or EBC value is used to compensate the color effect on alcohol content value
6) Carbohydrate content [Carb] in g/L units (grams per litre) is found from value of [Carb]=K*{100−[H2O]−[Alc]} where coefficient K is pre-determined.

Water Content

Water content [H2O] must be determined prior to alcohol content [Alc] and carbohydrate content [Carb]. The spectral data received from the spectrometer 16 for each scan denotes light intensity $I(\lambda)$ measured over the whole wavelength range of the UV-Vis-NIR spectrometer. All $I(\lambda)$ are corrected for dark current. A first empty-state spectral measurement is performed according to the scanning procedure steps 2c, 2e and 2f described above, specifically while with the container in an empty state that is devoid of any liquid, and contains only ambient air, thereby deriving an empty state light intensity measurement $I_e(\lambda)$ that is logged by the computer program and stored in an empty-state spectral log file. Since this first measurement is only of ambient air, and not any liquid substance, this first measurement need not necessary be performed with the dip probe specifically lowered into the sample container, and could instead involve performance of only steps 2e and 2f of the scanning procedure with the dip probe situated in the ambient room environment outside the sample container.

Next, a water-blank measurement step is performed according to the scanning procedure steps 2c to 2g described above, specifically while with the container in a water-filled state occupied by a volume of pure water, thereby deriving a water-blank light intensity measurement $I_w(\lambda)$ that is logged by the computer program and stored in a pure-water spectral log file.

Next, a sample measurement step is performed according to the scanning procedure steps 2a to 2g described above, specifically while with the container in a sample-filled state holding a sample liquid whose contents need to be determined, thereby deriving a sample light intensity measurement $I_s(\lambda)$ that is logged by the computer program and stored in a sample-liquid spectral log file.

Once the empty-state spectral measurement and water-blank measurement steps have been completed, followed by one or more performances of the sample measurement step, depending on whether one sample or a batch of multiple samples are being tested, then a number of different light absorbance measurements are calculated by the analytical algorithm for each sample, using the logged light intensity measurements $I_e(\lambda)$, $I_w(\lambda)$ and $I_s(\lambda)$. A pure-water light absorbance measurement is calculated as $A_{we}(\lambda)=-\log_{10}\{I_w(\lambda)/I_e(\lambda)\}$ and denotes light absorbance of the pure water blank whose light intensity $I_w(\lambda)$ was measured in the water-blank measurement step. A water-component light absorbance measurement of a sample is calculated as $A_{se}(\lambda)=-\log_{10}\{I_s(\lambda)/I_e(\lambda)\}$ and denotes light absorbance of the sample liquid that is attributable to water content of the sample liquid.

Figure 2A:
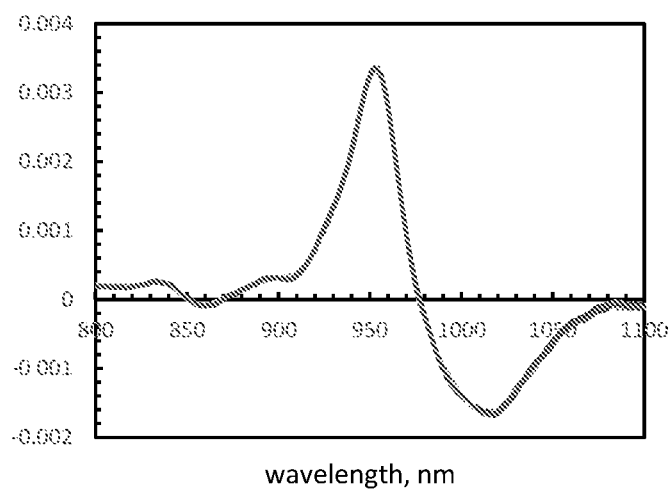
FIG. 2A is a plot of the first derivative of light absorbance $A'(\lambda)$ vs. wavelength, over a general NIR (near-infrared) wavelength range of 800-1100 nm, for four different model beers of varying water content, whose light absorbances were measured against a no-sample blank.
Figure 2B:
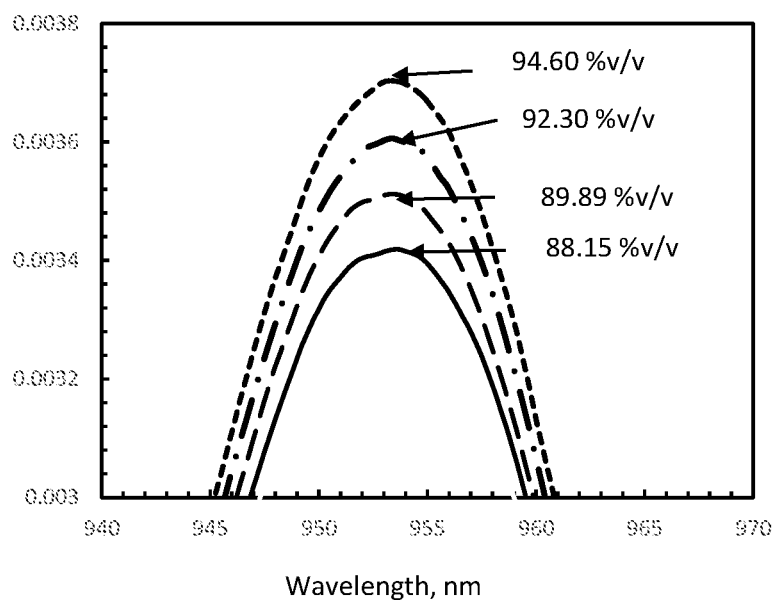
FIG. 2B is a partial closeup of the plot of FIG. 2A in a NIR wavelength range of 940-970 nm, showing details of variation of the light absorbance $A'(\lambda)$ among the four different model beers of varying water content (94.60%, 92.30%, 89.89% and 88.15% water v/v).
Figure 5:
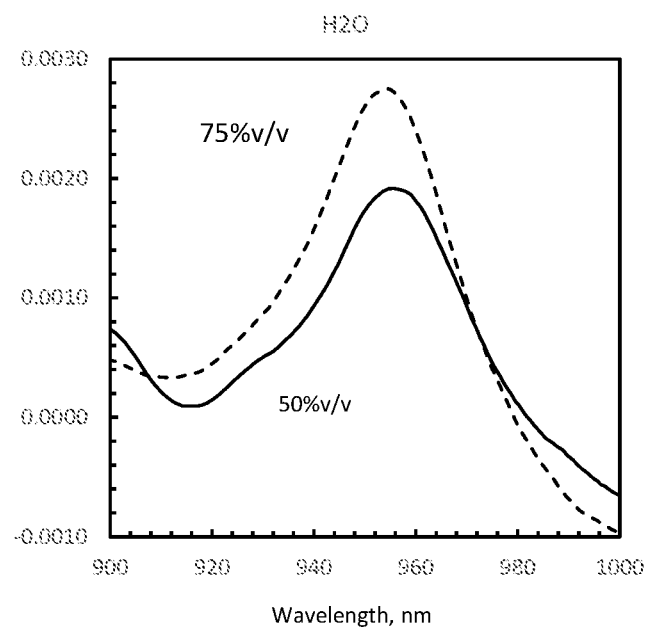
FIG. 5 is a plot of the first derivative of light absorbance A'(λ) of water-diluted Ethanol of 50 and 75% v/v water, whose light absorbances were measured versus no-sample blank.

Next, a water content ratio can be calculated by the algorithm as $W=A_{se}(\lambda)/A_{we}(\lambda)$, which denotes the ratio of the volume of water in the overall sample liquid to the overall volume of the entire sample liquid. Accordingly, the algorithm can then use this ratio to calculate the water content [H2O] of the sample liquid as [H2O]=W*100, in % v/v, or can calculate the water content directly as [H2O]= $100*A_{se}(\lambda)/A_{we}(\lambda)$, in in % v/v. $A_{se}(\lambda)$ and $A_{we}(\lambda)$ in these calculations are selected for a wavelength range corresponding to water light absorption, for example in the NIR range of 700-1100 nm. In an alternative calculation of the water content [H2O], a first derivative $dA(\lambda)/d\lambda=A'(\lambda)$ of the $A(\lambda)$ spectrum (of which FIGS. 2 and 5 show an example) can instead be used by the algorithm to calculate the water content as [H2O]=$100*A'_{se}(\lambda_0)/A'_{we}(\lambda_0)$, where a pre-defined wavelength $\lambda_0$ belongs to the wavelength range of water light absorption, for example in the NIR range of 700-1100 nm. As shown in FIG. 2B, $\lambda_0$ can be selected as a maximum of the derivative, which in the illustrated example is $\lambda_0$=954 nm, though another wavelength known to correspond to water content can alternatively be selected. In another alternative for calculating the water content [H2O], the algorithm may calculate an integral iA' of $A'(\lambda)$ over a pre-defined wavelength range $\Delta\lambda=\lambda_1-\lambda_2$, for example in the NIR range of 700-1100 nm, to reduce noise effect, and calculate water content as [H2O]=$100*iA'_{se}/iA'_{we}$. For example, in the test scenario shown in FIGS. 2A and 2B may be chosen as $\lambda_1$=960 nm, $\lambda_2$=940 nm, $\Delta\lambda$=20 nm; or $\lambda_1$=970 nm, $\lambda_2$=930 nm, $\Delta\lambda$=40 nm. Finally, once the water content [H2O] is calculated, the algorithm then calculates a water-corrected light intensity measurement $I_{wc}(\lambda)=I_w(\lambda)*[H2O]/100$, for use in subsequent determination of alcohol content [Alc].

Color

For the purpose of calculating a color value for beer, the algorithm can now calculate a water-corrected light intensity measurement $A_{wc}=-\log_{10}\{I_{wc}(\lambda)/I_e(\lambda)\}$. Using this water-corrected light intensity measurement $A_{wc}$, beer color value can then be calculated by the algorithm on the SRM scale, where SRM=$A_{wc}(430)*12.7*D$, and/or on the EBC scale, where EBC=$A_{wc}(430)*25.02*D$, where D is a dilution factor (ref. 30). For wine, color can be estimated using light absorbance values at particular wavelengths of 420, 520 and 620 nm, for example to calculate a wine color intensity as $A_{420}+A_{520}+A_{620}$, and/or calculating wine hue as $A_{420}/A_{520}$. For colored distilled spirits like brandy, cognac, and whiskey, a universal RGB code may be applied.

Alcohol Content

In the context of beverages, "alcohol" means Ethyl Alcohol or Ethanol (EtOH). The program determines alcohol content [Alc] based on light absorption according to Beer-Lambert Law (BLL), using the water-corrected light intensity measurement $I_{wc}(\lambda)$. For such purposes, the algorithm calculates an alcohol light absorbance measurement of the sample $A_{sw}(\lambda)=-\log_{10}\{I_s(\lambda)/I_{wc}(\lambda)\}$ in the wavelength range corresponding to alcohol content in water-containing sample, for example in the range of 800-1100 nm. According to BLL, alcohol content value is calculated by the program as [Alc]=$A_{sw}(\lambda)/\{\varepsilon(\lambda)*L\}$ where $\varepsilon$ is extinction coefficient of alcohol, and L is a light pathlength. In the case of the illustrated dip probe 12 of the present invention, L is twice the axial distance between the reflector 42 the and glass shield 46.

Figure 3:
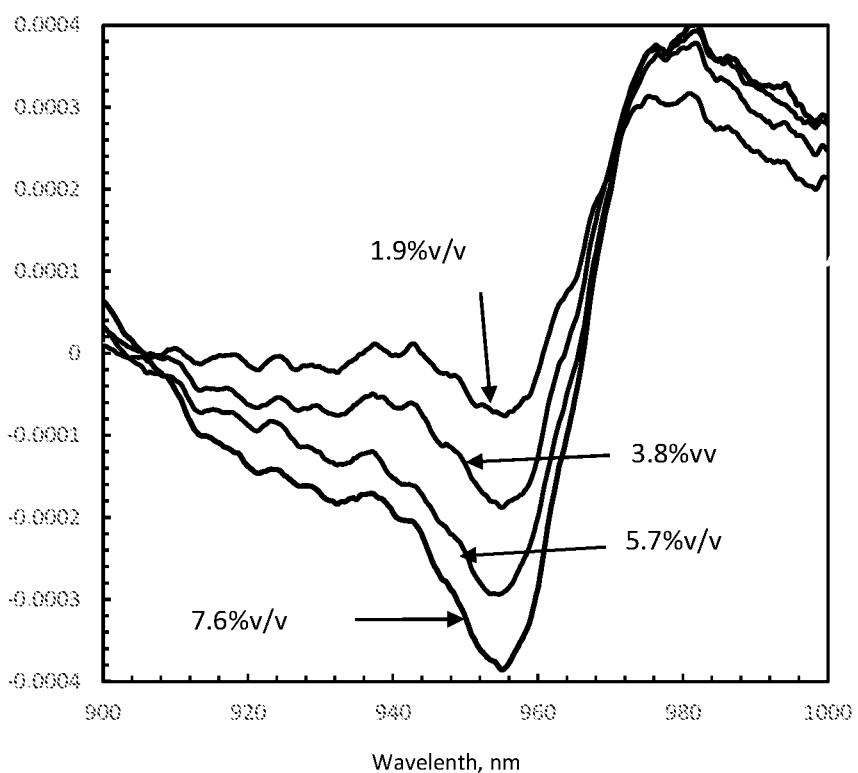
FIG. 3 is a plot of the first derivative of light absorbance $A'(\lambda)$ of four different model beers of varying alcohol content (1.9%, 3.8%, 5.7% and 7.6% alcohol v/v).
Figure 4A:
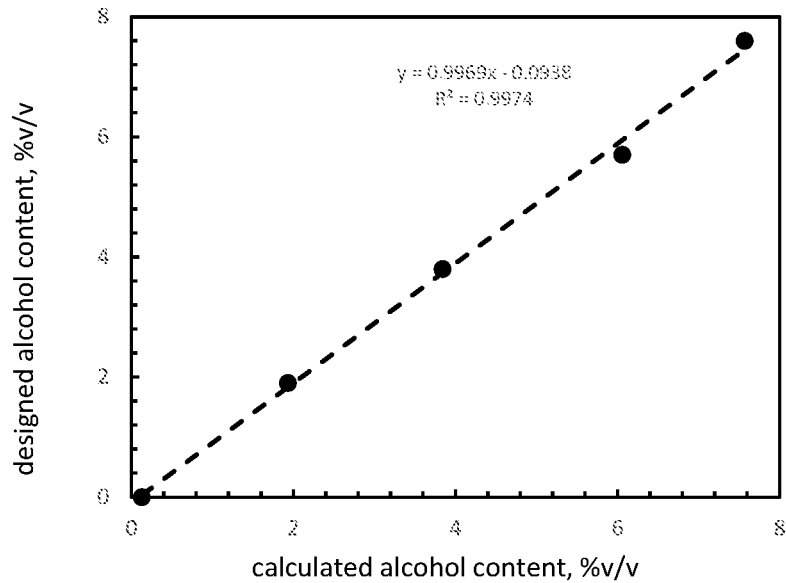
FIG. 4A is a plot of actual (designed) alcohol content of one model beer vs. the calculated alcohol content derived from measurement with the testing apparatus of FIG. 1.
Figure 4B:
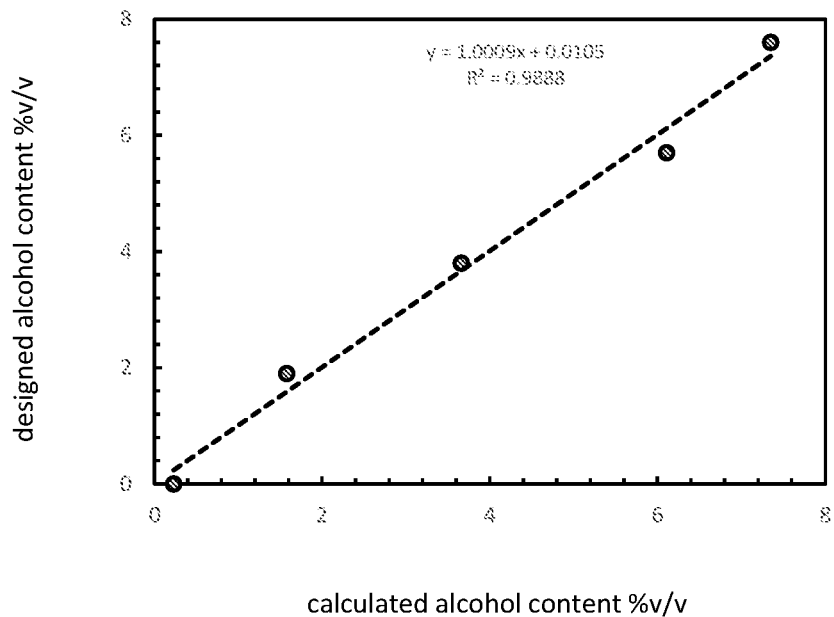
FIG. 4B is a plot of actual (designed) alcohol content of another model beer vs. the calculated alcohol content derived from measurement with the testing apparatus of FIG. 1.
Figure 6:
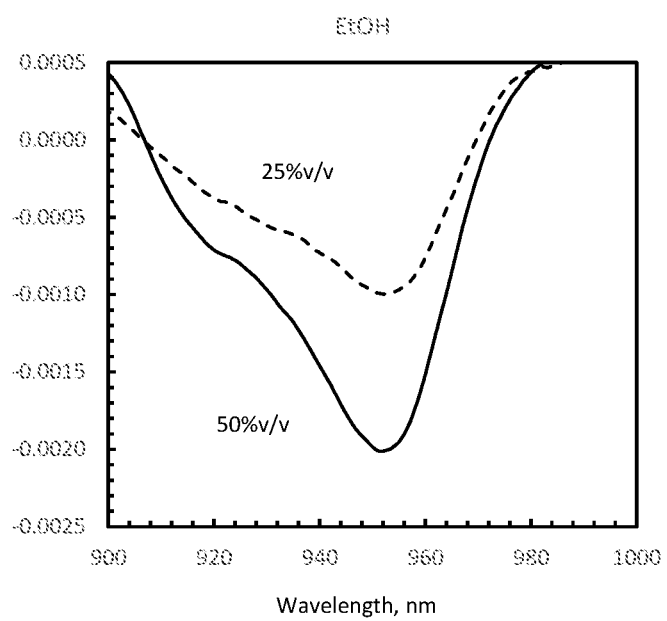
FIG. 6 is a plot of the first derivative of light absorbance A'(λ) of water-diluted Ethanol of 25 and 50% v/v Ethanol, whose light absorbances were measured versus a water blank.

Similar to the forgoing description of the water content determination procedure, alcohol content may alternatively be calculated using the first derivative of light absorbance and the extinction coefficient, in which case the program calculates [Alc]=$dA_{sw}(\lambda)/\{d\varepsilon(\lambda_0)*L\}$ at an appropriate wavelength $\lambda_0$, or using integrals $iA_{sw}$ and $i\varepsilon$ of the first derivatives of light absorbance and the extinction coefficient, in which case the algorithm calculates [Alc]=$iA_{sw}/\{i\varepsilon*L\}$ in the wavelength range corresponding to alcohol light absorption. FIG. 3 demonstrates first derivatives $A'_{sw}(\lambda)$ for model beers of varying alcohol content. FIG. 6 demonstrates $A'_{sw}(\lambda)$ for EtOH-water mixtures of varying content of EtOH. Both figures show the appropriate wavelength range for integration $\Delta\lambda=\lambda_1-\lambda_2$ may be $\lambda_1$=960 nm, $\lambda_2$=940 nm, $\Delta\lambda$=20 nm, in one non-limiting example. In the calculation of alcohol content, the value of $\{\varepsilon(\lambda)*L\}$ is specific to each Dip Probe unit and requires a specific calibration as described in the Calibration Methodology section. It is implied that the coloring components of the beverage do not contribute to the light absorption in the NIR wavelength range of 800-1000 nm. Use of food dyes at the model beverage design is known to conform with this implication (see ref. [24,25]). Calibration methods disclosed herein further below for deriving and correcting the calculation coefficients that are used by the algorithm use percentage by volume (% v/v), and so the alcohol content value [Alc] is calculated in % v/v units, but can be subsequently converted to % w/w units using known calculations.

Carbohydrate Content

The algorithm's determination of carbohydrate content is based on the principle that any carbohydrate in the sample liquid is contributed by content thereof other than the calculated water content [H2O] and calculated alcohol content [Alc], whose combined volume denote a substantive overall fraction of the sample liquid's total volume. Therefore, any components of the sample liquid that contribute carbohydrate content thereto also account for any remainder of the overall sample volume that is not attributed to the sample's water and alcohol content. This remaining volume attributable to carbohydrate-containing substances is referred to herein as a remnant volume, and is calculated by the program as $\Delta V_{rem}$=100−[H2O]−[Alc], in units of % v/v. Using this remnant volume, the program calculates carbohydrate content as [Carb]=$K*\Delta V_{rem}$, where K is a predetermined carbohydrate coefficient whose units are the same as [Carb], for example g/L. The value of K can be derived experimentally, for example by adding a known amount of sugar to a predetermined volume of a carbohydrate-free water-containing liquid, and measuring the change in the volume in units of % v/v. This predetermined K value is programmed into the algorithm. The effect of temperature should be considered as affecting the liquid volume. For a sample liquid with no carbohydrate, $\Delta V_{rem}$=0. A sample liquid having no alcohol does not affect the carbohydrate content determination, in which case $\Delta V_{rem}$=100−[H2O], in % v/v units.

Calibration Methodology

For the purpose of calibrating the apparatus, a standardized set of model liquids (collectively referred to as a calibration standard) is used to simulate a particular type of sample liquid that will be subjected to measurement by the apparatus. The different model liquids within the calibration standard are composed with precisely measured quantities of the same component ingredients as one another, but in differing relative proportions. So, for example, for testing of beverages, model beverages of a calibration standard are modeled to resemble a particular type of beverage for which the apparatus is intended to test e.g. beer, wine, distilled spirits, soft drinks, juices, etc. Model beverages (MBs) may be composed from scratch, using water, ethanol, carbohydrate, and food dye to mimic the type of beverage concerned.

Alternatively, for alcoholic beverages, non-alcoholic versions of the beverage type concerned may be used as a base or main substance (MS) for a standardized set of model liquids, to which alcohol is added in varying and precisely measured quantities to calibrate the apparatus for alcohol content. So, for example, for beer analysis, the main substance may be designed using (a) water colored with food dyes, or (b) non-alcoholic beer (Ref. 37) of various colors. For wine analysis, the MS may be designed using non-alcoholic wines of various color (white, rose, red). For distilled liquors, the MS may be non-colored water to simulate clear distilled liquors (e.g. vodka) or water colored with food dyes to simulate dark distilled liquors (whiskey, brandy, cognac etc.). When using non-alcoholic beer or wine as the main substance, the alcohol content of same should ideally be confirmed independently using other methods to ensure an accuracy of 0.0% v/v to ensure calibration accuracy.

A non limiting example of a calibration standard, purely for illustrative purpose, is set forth as follows, and is composed of five different model beverages mb0-mb4, which are of equal standard volume (25 mL) and carbohydrate content (47.7 g/L) to one another, but vary from one another in their relative proportion of water and alcohol. Here the model beverages are model beers, of which the main substance is a non-alcoholic beer of 0.0% v/v alcohol, known carbohydrate content (51.9 g/L) and equal MS component volume (23 mL) among all the model beverages in the standard, to each of which water and alcohol are added in varying proportions but equal combined component volume (2 mL).

Example Beer Calibration Standard
  Volume of standard: 25.0 ml
  H2O, distilled water, [H2O], water content in % v/v units
  EtOH, ethanol of pre-determined initial concentration
    [EtOH], ethanol content in % v/v units pre-determined basing on initial [EtOH]=95% v/v Carb content may vary depending on beverage
  [Carb], content of Carb in g/L units. Initial MS+Carb is taken of 51.9 g/L

| name: | MS + | | | | content of components | | |
|---|---|---|---|---|---|---|---|
| | Carb, mL | H2O, mL | EtOH, mL | MB, mL | [H2O] % v/v | [EtOH] % v/v | [Carb] g/L |
| mb0 | 23.0 | 2.00 | 0.00 | 25.0 | 96.8 | 0 | 47.7 |
| mb1 | 23.0 | 1.50 | 0.50 | 25.0 | 94.9 | 1.9 | 47.7 |
| mb2 | 23.0 | 1.00 | 1.00 | 25.0 | 93.0 | 3.7 | 47.7 |
| mb3 | 23.0 | 0.50 | 1.50 | 25.0 | 91.1 | 5.8 | 47.7 |
| mb4 | 23.0 | 0.00 | 2.00 | 25.0 | 89.2 | 7.6 | 47.7 |

It will be appreciated that this exemplary calibration standard is one designed particularly for an apparatus intended for testing of beer samples, where an average of 5.0% v/v alcohol concentration would be typical of many beers. Similar protocols may be created for MB of difference ranges of alcohol content, variation of color, sugar and water content by varying initial MB components concentration. Model beverages may be prepared in advance, and safely stored until calibration is required to maintain the integrity of the standard. Extended shelf time of a model beverage may achieved by addition of a non-poisoning preservative, like sulphur dioxide, which is widely used in beer or wine production (Ref. 38). Alcohol may also serve as a preservative.

Using a calibration standard composed of a set of such model beverages of matching main substance but varying alcohol and water proportions, the calibration procedure starts by performing scanning procedure steps 2a to 2g described above on each of the model beverages in the calibration standard, and having the software program run the saved spectral datasets from these model beverages through the analytical algorithm described above to derive the calculated v/v water concentration [H2O], calculated v/v alcohol concentration [Alc], and calculated w/v carbohydrate concentration [Carb]. These calculated values for all model beverages in the calibration standard are then quantitively compared against the actual pre-determined water, alcohol and carbohydrate concentrations of the calibration standard. This comparison is used to derive appropriate correction factors, which are then used to program updated calibration factors into the programmed calculation formulas of the algorithm. Generally speaking, the stability of the testing apparatus allows the calibration factors to remain static for significant periods of time, and so only periodic calibration would normally be required, rather than before each and every use of the apparatus.

Though the illustrated embodiment employs an apparatus with a dib probe submersible in a sample liquid in an open top container, it will be appreciated that the scanning procedure may alternatively be carried out using a standard spectrophotometer, provided that the operational software for capturing the spectral data therefrom has been modified to embody the novel algorithm disclosed herein to derive the desired resultant data achievable thereby.

Though the detailed embodiment above concerns the determination of water, alcohol and carbohydrate content in alcoholic beverages using a double-blank testing procedure where a first empty-state measurement step performed on ambient air denotes an empty blank, and a subsequent water-filled measurement performed on pure water denotes a subsequent liquid blank, it will be appreciated that the same double blank testing procedure may also be useful in instances where the second blank (the liquid blank) is performed on a constituent liquid of the sample other than water, and the first liquid concentration calculated is that of this other constituent liquid. For example, in a sample where alcohol is the solvent instead of water, the liquid-filled measurement step is performed on pure or substantially pure volume of alcohol, and the light intensity measurements from the empty-state and liquid-filled measurement steps are used to calculate the concentration of alcohol in the sample, rather than the concentration water in the sample.

Turbidity Determination & Light Scattering Correction

The dip probe allows determination of the sample turbidity at 180°. The reflected light intensity measured with the dip probe, may deviate from 180° because of non-ideal reflective surface. Then, even non-light-scattering samples may determine a reduction of light intensity. The difference between non-scattering and scattering light spectra allows elimination of this effect.

Use of the dip probe in conjunction with the presently disclosed light scattering correction allows the probe's insertion into the reaction mixture during production of the final liquid product, for example insertion of the probe into a brewing vessel during beer production. This option allows in-situ measurements to be taken instead of requiring sample extraction from the reaction mixture, and therefore allows monitoring (automatically or manually) of the water, alcohol, carbohydrates, and turbidity directly at the point of production in substantially instantaneous fashion and permanently without the steps and sanitary precautions necessary for sample extraction. In such in-situ applications, the same measurement-taking sequence described above under the heading "Scanning of container contents" is followed, but without extracting a small sample into a dedicated sample container, and instead using the dip probe in-situ at the point of production of a liquid product, for example in a beer brewing vessel.

To apply this approach, pure-water light absorbance $A_{we}(\lambda)=-\log_{10}\{I_w(\lambda)/I_e(\lambda)\}$ calculated using the measured liquid-blank light intensity measurement $I_w$ and empty-state light intensity measurement $I_e$ is used as a measure of pure-water optical density $OD_0(\lambda)=A_{we}(\lambda)$, and a sample light absorbance $A_{se}(\lambda)=-\log_{10}\{I_s(\lambda)/I_e(\lambda)\}$ calculated using the measured sample light intensity measurement $(I_s)$ and the empty-state light intensity measurement $(I_e)$ is used as a measure of sample optical density $OD_s(\lambda)=A_{se}(\lambda)$. The wavelength range $WLR_s$ in which these logarithmic wavelength plots of $OD_0$ and $OD_s$ are analyzed is a predetermined wavelength rage in which optical density is known or predicted to be attributable solely to light scattering should relate to the light scattering. For example, $WLR_s$=850-900 nm is predicted to be effective for most, if not all, beer samples. $\Delta OD$ $(\log_{10}\lambda)=OD_s(\log_{10}\lambda)-OD_0(\log_{10}\lambda)$ is a linear function of $\log_{10}\lambda$ with slope $\Delta(Slope)$ and intercept $\Delta(Int)$: $\Delta OD$ $(\log_{10}\lambda)=\Delta(Slope)\times\log_{10}\lambda+\Delta(Int)$.

Calibration Methodology

Figure 7A:
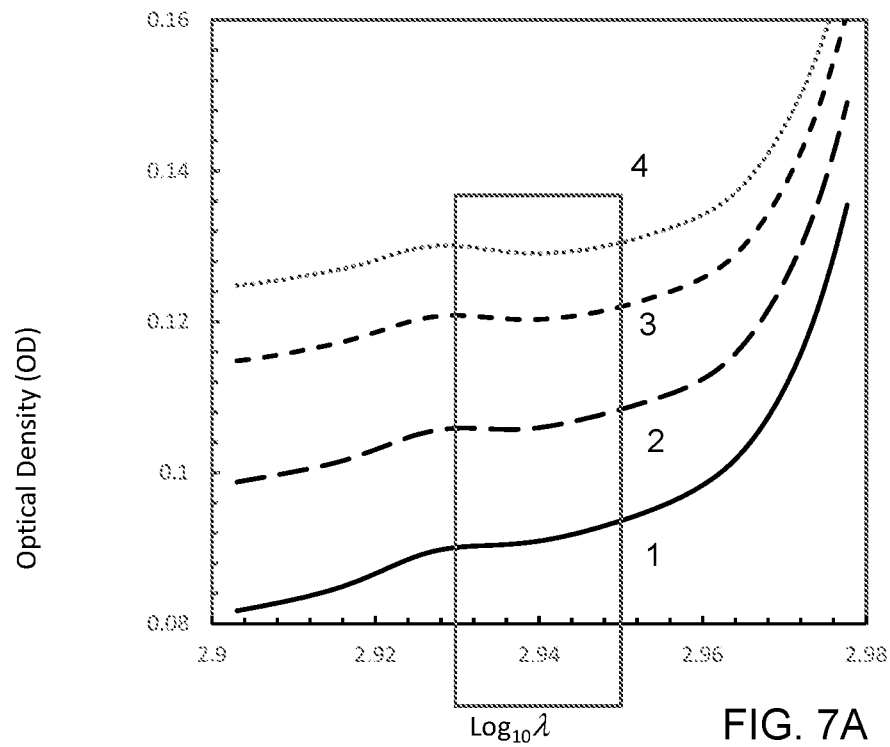
FIG. 7A shows optical density (OD) spectra vs $Log_{10}$ of wavelength ($log_{10}λ$) related to water (curve 1) and to Formazin suspensions of 40 FTU (curve 2), 80 FTU (curve 3) and 100 FTU (curve 4). The rectangular area indicates a selected wavelength range of 850-900 nm (in the $Log_{10}λ$ units) in which the integral $Δ_x(Slope)=∫[OD_x(λ)-OD_1(λ)]d Log_{10}λ$, (here x=2, 3, 4 are the spectra numbers), was taken.
Figure 7B:
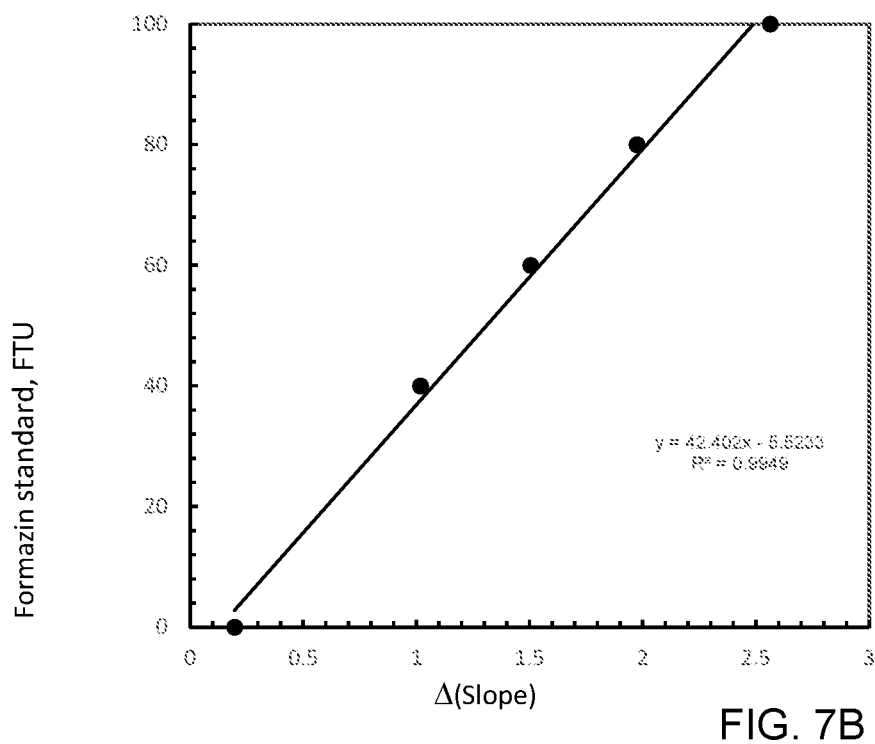
FIG. 7B shows linear correlation between Δ(Slope), derived from FIG. 7A, and Formazin standard suspensions of 0-100 FTU. The best linear fit was 42.402×Δ(Slope)−5.5233, $R^2$=0.9949.
Figure 7C:
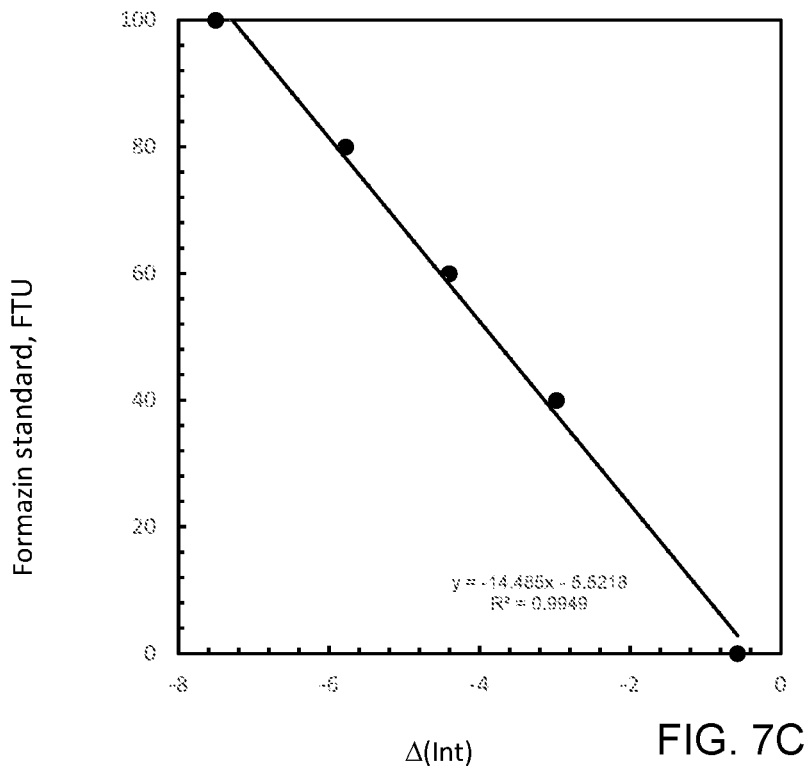
FIG. 7C shows the linear correlation between Δ(Intercept), derived from FIG. 7A, and Formazin standard suspensions of 0-100 FTU. The best linear fit was −14.485×Δ(Intercept)−5.5218, $R^2$=0.9949.

Formazin standard suspensions of various FTU plots versus $\Delta(Slope)$ or $\Delta(int)$. Either $\Delta(slope)$ or $\Delta(Int)$ can be used for calibration. FIGS. 7B and 7C show dependence of Formazin standard (FTU) on $\Delta(Slope)$ and $\Delta(Int)$ taken as an example. It resulted in the best linear fit of FTU=42.402× $\Delta(Slope)$-5.5233 ($R^2$=0.9949) and of FTU=-14.485×$\Delta$(Int)-5.5218 ($R^2$=0.9949). Such equations are applied for the turbidity determination using $\Delta(Slope)$ or $\Delta(Int)$ found for the sample optical density spectrum, as set forth in the Test Methodology below.

Test Methodology

A) Turbidity Determination

The turbidity determination procedure consists of:
(1) finding $A_{we}(\lambda)=OD_0(\lambda)$ and $A_{se}(\lambda)=OD_s(\lambda)$ in the predetermined $WLR_s$;
(2) converting $OD_0(\lambda)$ and $OD_s(\lambda)$ to $OD_0(\log_{10}\lambda)$ and $OD_s(\log_{10}\lambda)$;
(3) plotting $OD_0(\log_{10}\lambda)$ and $OD_s(\log_{10}\lambda)$ versus $\log_{10}\lambda$ in $WLR_s$;
(4) finding the Slope (SLP) and Intercept (INT) of the plots of $OD_0(\log_{10}\lambda)$ and $OD_s(\log_{10}\lambda)$;
(5) finding the difference $\Delta(SLP)$ and $\Delta(INT)$ of these two Slopes and Intercepts;
(6) alternatively, $\Delta(SLP)$ and $\Delta(INT)$ may be found as the slope and intercept of $\Delta OD$ $(\log_{10}\lambda)=OD_s(\log_{10}\lambda)-OD_0(\log_{10}\lambda)$ linear function of $\log_{10}\lambda$:
(7) calculating FTU values from the best linear fit of Formazin standard using either $\Delta(SLP)$ or $\Delta(INT)$ (see FIGS. 7B and 7C as an example).

Figure 7D:
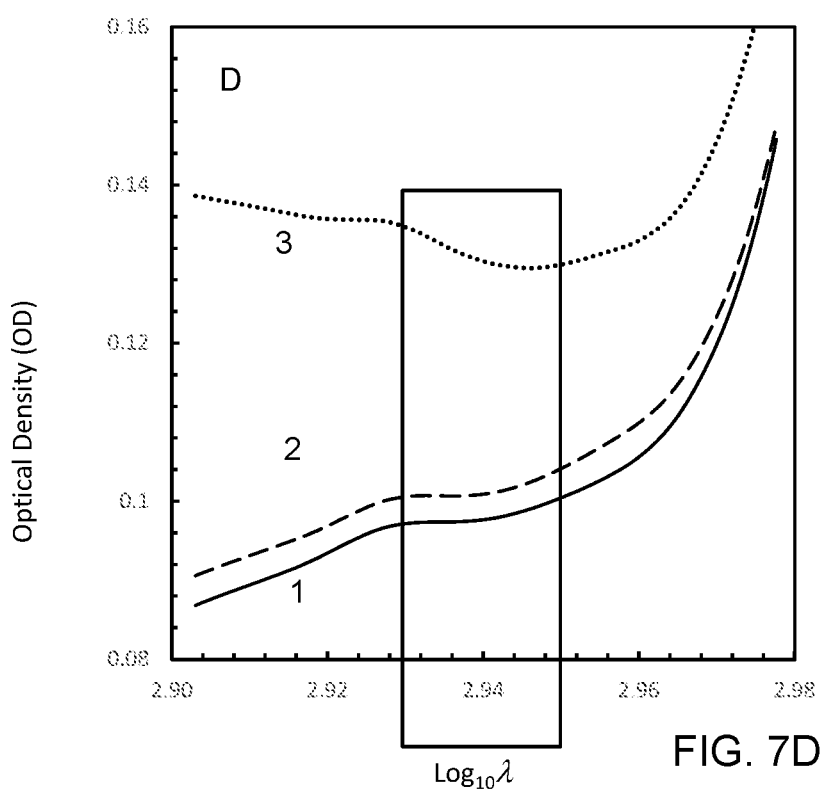
FIG. 7D shows the optical density (OD) spectra vs $Log_{10}$ of wavelength ($Log_{10}λ$) related to water (curve 1) and two real beers: Old Style Pilsner (curve 2) and English Malt Ale (curve 3). Δ(Slope) values were 0.228 and 2.182, respectively. Turbidity values were found 4.1 FTU and 87.0 FTU, correspondingly, according to the linear fit (FIG. 7B).

FIG. 7D shows the OD spectra for two test real beers: Old Style Pilsner and English Malt Ale. $\Delta(Slope)$ values were 0.228 and 2.182, respectively. Turbidity values were found 87.00 FTU and 4.14 FTU, correspondingly, according to the best linear fit (FIG. 7B). $\Delta(INT)$ values found using the best linear fit (FIG. 7C) were −0.6675 and −6.387 resulting in the turbidity values of 87.00 FTU and 4.15 FTU, respectively. Turbidity values found by $\Delta$ (Slope) and $\Delta$ (INT) were essentially the same.

This turbidity determination procedure does not require additional spectral measurements beyond those described herein above, and is just an extra part the total spectral beer calculational analysis. The approach allows determination of the turbidity in various units of FTU, European units (EBC), or ASBS units. The approach substitutes the common-used nephelometer methods that employ specific specialized instruments (turbidimeters, nephelometers).

B) Correction of Light Absorption Spectrum

The originally measured optical density spectra $A_{we}(\lambda)$ and $A_{sw}(\lambda)$ may each be corrected for both the light scattering and deviation from ideal 180° applying the following procedures:

$A_{we}(\lambda)$ Correction:
(1) find and plot a pure-water optical density spectrum $A_{we}(\lambda)$ in the predetermined $WLR_s$;
(2) find the Slope $(SLP_{we})$ and Intercept $(INT_{we})$ of $A_{we}(\lambda)$ in the predetermined $WLR_s$;
(3) find the difference $OD_{we-corr}(\lambda)=\{A_{we}(\lambda)-(SLP_{we}\times\lambda+INT_{we})\}$, which is the pure-water light absorption spectrum corrected for light scattering; and
(4) substitute $OD_{we-corr}(\lambda)$ for $A_{we}(\lambda)$ in either of the earlier described water content calculations, and therefore instead calculate the water content as [H2O]=100× $A_{se}(\lambda)/OD_{we-corr}(\lambda)$, or [H2O]=100×$A'_{se}(\lambda)/OD'_{we-corr}(\lambda)$.

$A_{sw}(\lambda)$ Correction:
(1) find and plot a sample optical density spectrum $A_{sw}(\lambda)$ in the predetermined $WLR_s$;
(2) find the Slope $(SLP_{sw})$ and Intercept $(INT_{sw})$ of $A_{sw}(\lambda)$ in the predetermined $WLR_s$; and
(3) find the difference $OD_{sw-corr}(\lambda)=\{A_{sw}(\lambda)-(SLP_{sw}\times\lambda+INT_{sw})\}$, which is the sample light absorption spectrum corrected for light scattering; and
(4) substitute $OD_{sw-corr}(\lambda)$ for $A_{sw}(\lambda)$ in either of the earlier described alcohol content calculations, and therefore instead calculate the alcohol content as [Alc]= $dOD_{sw-corr}(\lambda)/\{d\varepsilon(\lambda_0)*L\}$, or [Alc]=$OD_{sw-corr}(\lambda)/\{\varepsilon(\lambda_0)*L\}$.

It is expected that the same WLR will typically used in the determination of both optical densities, though there may be instances where this is not the case. This corrective procedure is similar to the determination of light scattering because in a small WLR $Log_{10}\lambda$ is a linear function of wavelength $(\lambda)$(y=0.0005$\lambda$+2.5076) with high correlation coefficient of $R^2$=0.9999.

Figure 8:
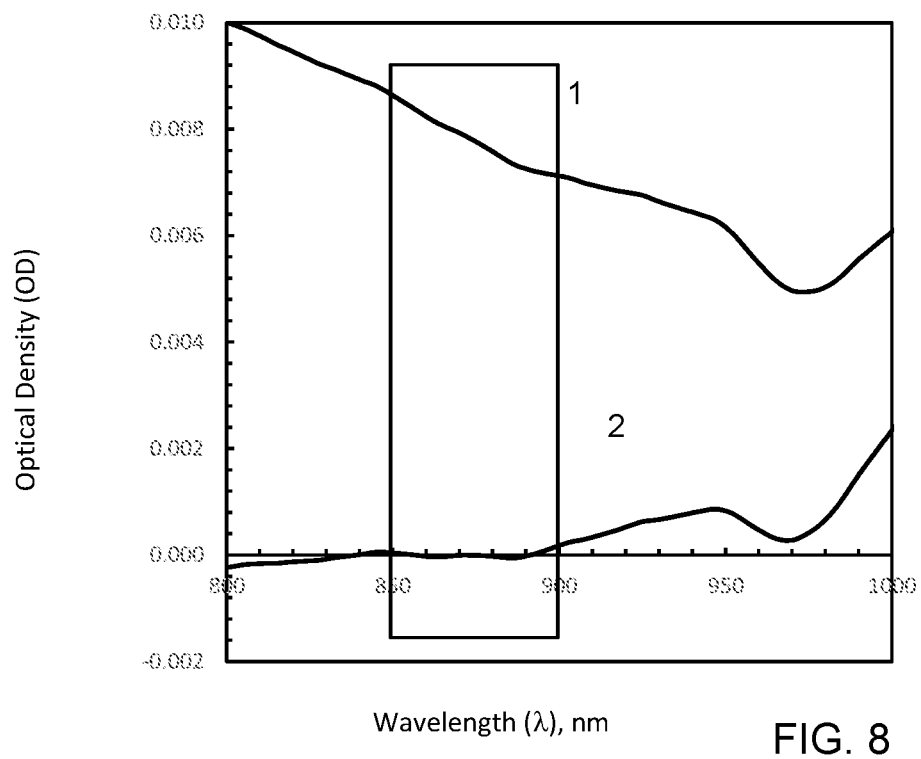
FIG. 8 shows the optical density spectrum of a Formazin suspension of 40 FTU before (curve 1) and after (curve 2) light scattering correction. The rectangular area indicates the selected wavelength range of 850-900 nm used for the light scattering correction.

FIG. 8 demonstrates $OD_{corr}(\lambda)$ for Formazin suspension of 40 FTU before (curve 1) and after (curve 2) correction. Like the turbidity determination procedure, the OD correction procedure makes use of the Slope and Intercept of the optical densities derived from the pure water and sample spectra, but in terms of wavelength $(\lambda)$ instead of $Log_{10}(\lambda)$, and thereby allows more accurate determination of water and alcohol content using $OD_{corr}(\lambda)$ spectrum.

Since various modifications can be made in the invention as herein above described, and many apparently widely different embodiments of same made, it is intended that all matter contained in the accompanying specification shall be interpreted as illustrative only and not in a limiting sense.

REFERENCES

Each of the cited documents below is incorporated herein by reference in its entirety.

US Patents
1. U.S. Pat. No. 8,106,361 B2 January/2012 Roman Benes
2. U.S. Pat. No. 6,885,003 B1 April/2005 Marc Dubernet
3. U.S. Pat. No. 6,690,015 B1 February/2004 Roman Benes, Josef Pleschiutschnig, Franz Reininger, Alessandro, Del Bianco
4. U.S. Pat. No. 5,679,955 October/1997 Stefan Schmidt, Luc Thévenaz
5. U.S. Pat. No. 5,126,570 June/1992 Donald L. B0059
6. 20150160248 Eugene Gussakovsky, Efim Gussakovsky
7. 20040157334A1 Barashkov et al.

Other Publications
8. Peter Bruttel and Regina Schlink, Water determination by Karl Fischer Titration. Metrohm
9. Water in oil analyzer OILAN A4, Kytola Instruments, www.kytola.ca
10. The importance of grape water content. ETS Labs, www.etslabs.com
11. Measuring the actual alcohol content (vol) of wine; www.winegrowers.info
12. Alcoholic strength and measurement; Craft Beer & Brewing; https://beerandbrewing.com
13. Michael H. Beckett2 and Vicki L. Pavelsek, Automatic Alcohol and Real Extract Determination; 1986 American Society of Brewing Chemists, Inc.
14. If sugar is mixed in water, say for example 5 ltr water and 1 kg sugar, how much would be the volume of final solution? www.Quora.com
15. Measurement of carbohydrates in wort and beer—A Review; Journal of Institute for Brewing, 1978, vol. 84, pp. 13-21
16. What Happens to the Volume of Water When Sugar Is Dissolved in It? www.reference.com
17. WineScan_Solution_Brochure_EN; https://www.fossanalytics.com/en/prod4zzucts/winescan#Papers_and_Brochures_BrochureSpo
18. TTB Winery Laboratory Methods
19. List of Methods of Analysis for Beverage Alcohol; TTB Official Methods
20. Alcohol in beer; www.cdrfoodlab.com
21. Fast HPLC analysis for fermentation ethanol processes, Waters Application Notes
22. Ethanol K-ETOH_DATA Megazyme.
23. Camilla Brus, Techniques for determining alcohol levels in wine and mulled wine, 2015
24. Crowell E. A. and Ough C. S. A modified procedure for alcohol determination by dichromate oxidation; American Journal of Enology and Viniculture, 1979, vol. 20, pp. 161-162
25. Amjad H. El-Sheikh, Yahya S. Al-Degs, Spectrophotometric determination of food dyes in soft drinks by second order multivariate calibration of the absorbance spectra-pH data matrices. Dyes and Pigments, 2013, vol. 97, pp. 330-339
26. Food dye analysis, 2009 Royal Society of Chemistry www.rsc.org
27. Weiner j., Determination of total carbohydrate in beer, J. Inst. Brew., 1978, Vol. 84, pp. 222-223
28. ASBC Methods of Analysis, Beer-41, Total carbohydrates
29. Optical Ethyl Alcohol Meter for Process Control, McNab Inc., Virginia, USA
30. Standard Reference Method, Wikipedia
31. Sonja Engelhard, et al. Ethanol Content of Beer Using Interpretive Near-Infrared Spectroscopy, Applied Spectroscopy, Vol. 58, Issue 10, pp. 1205-1209 (2004)
32. Qingbo Fu, et al Short-Wave Near-Infrared Spectrometer for Alcohol determination and temperature correction, Journal of Analytical Methods in Chemistry Volume 2012, Article ID 728128, 7 pages
33. Prapatsorn Tipparat, et al., Determination of ethanol in liquor by near-infrared spectrophotometry with flow injection, Talanta 53 (2001) 1199-1204
34. Anna G. Cavinato, et al. Method for Monitoring Ethanol in Fermentation Processes Using Fiber-Optic Near-Infrared Spectroscopy, Anal. Chem. 1990, 62, 1977-1982
35. B. R. Buchanan et al. Detection of ethanol in wines using optical-fiber measurement s and near-infrared analysis. Applied Spectroscopy, 1988, vol 42, p. 1106-1111.
36. Juan Fernández-Novales et al. Shortwave-near infrared spectroscopy for determination of reducing sugar content during grape ripening, winemaking, and aging of white and red wines, Food Research International 42 (2009) 285-291
37. Sohrabvandi, S. at al. Alcohol-free Beer: Methods of Production, Sensorial Defects, and Healthful Effects, Food Reviews International, vol. 26: N4, pp. 335-352
38. https://www.skalar.com/news/total-sulfur-dioxide-so2-in-beer
39. https://www.homebrewersassociation.org/how-to-brew/beer-haze-cloudy-homebrew/
40. Formazin Safety Data Sheet, Supelco, www.sigmaaldrich.com, revision date 15.07.2020
41. ASBC Methods of Analysis, Beer 26, Formazin Turbidity Standards
42. ASBC Methods of Analysis 2008, Beer Inclusions: Common Causes of Elevated Turbidity
43. C. F. Bohren, D. Huffman, Absorption and scattering of light by small particles, John Wiley, N.Y. 1983.
44. ASBC Methods of Analysis, Beer-1, Sampling

The invention claimed is:
1. A testing method for determining contents of liquids, said method comprising:
  (a) obtaining a subject liquid composed of multiple substances, at least one of which is a liquid component whose concentration is to be measured;
  (b) using a testing apparatus comprising a light source for transmitting light through said subject liquid along a light path of known length (L) therethrough, a spectrometer operable to measure an intensity of the light after travel thereof through said subject liquid on said light path, and one or more computing devices connected to said spectrometer to receive light intensity measurements therefrom, performing the following steps:
    (i) a liquid-absent measurement step comprising transmission of light along said light path in a state thereof absent of any liquid substance, and measurement by the spectrometer of the intensity of said light after travel of said light along said light path in said absence of any liquid substance, thereby obtaining an liquid-absent light intensity measurement ($I_e$) from the spectrometer;
    (ii) a liquid-blank measurement step comprising transmission of light by said light source along said light path during occupancy of said light path by a pure unmixed volume of said liquid component, and measurement by the spectrometer of the intensity of said light after travel of said light along said light path and through said pure unmixed volume of said liquid component, thereby obtaining a liquid-blank light intensity measurement ($I_w$) from the spectrometer;

(iii) a subject liquid measurement step comprising transmission of light by said light source along said light path during occupancy of said light path by the subject liquid, and measurement by the spectrometer of the intensity of said light after travel along said light path and through said subject liquid, thereby obtaining a subject light intensity measurement ($I_s$) from the spectrometer;

(c) using said liquid-absent light intensity measurement ($I_e$), said liquid-blank light intensity measurement ($I_w$), and said subject light intensity $I_s$ measurement, calculation by the one or more computing devices of both a volume concentration of the liquid component in said subject liquid, and a liquid-corrected light intensity ($I_{wc}$);

wherein, among said liquid substances of which the subject liquid is composed, said liquid component is water and the pure unmixed volume of the liquid component in the liquid-blank measurement step (b)(ii) is pure water, whereby the liquid-blank light intensity measurement ($I_w$) measured in the liquid-blank measurement step (b)(ii) is a water-blank light intensity measurement, the liquid-corrected light intensity ($I_{wc}$) calculated in step (c) is a water-corrected light intensity, and said volume concentration of the liquid component calculated in step (c) is a volume concentration of water.

2. The method of claim 1 wherein said multiple substances of which the subject liquid is composed, in addition to said water, also includes alcohol, and the method further comprises:

(d) using said subject light intensity measurement ($I_s$), said water-corrected light intensity measurement ($I_{wc}$), and said known length of the light path, calculation by the computing device of a volume concentration of alcohol ([Alc]) in said subject liquid.

3. The method of claim 2 wherein said multiple substances of which the subject liquid is composed, in addition to said water and said alcohol, also includes carbohydrate, and the method further comprises:

(e) subtraction, by the one or more computing devices, of said volume concentration of water ([H2O]) and said volume concentration of alcohol ([Alc]) from a total 100% volume concentration of the subject liquid, thereby calculating a remnant volume concentration attributable to constituents of the subject liquid other than said water and said alcohol; and (f) using said remnant volume concentration and an experimentally derived carbohydrate coefficient, calculation by the one or more computing devices of a carbohydrate concentration ([Carb]) of the subject liquid.

4. A testing method for determining contents of liquids, said method comprising:

(a) obtaining a subject liquid composed of multiple substances, at least one of which is a liquid component whose concentration is to be measured;

(b) using a testing apparatus comprising a light source for transmitting light through said subject liquid along a light path of known length (L) therethrough, a spectrometer operable to measure an intensity of the light after travel thereof through said subject liquid on said light path, and one or more computing devices connected to said spectrometer to receive light intensity measurements therefrom, performing the following steps:

(i) a liquid-absent measurement step comprising transmission of light along said light path in absence of any liquid substance, and measurement by the spectrometer of the intensity of said light after travel of said light along said light path in said absence of any liquid substance, thereby obtaining an liquid-absent light intensity measurement ($I_e$) from the spectrometer;

(ii) a liquid-blank measurement step comprising transmission of light by said light source along said light path during occupancy of said light path by a pure unmixed volume of said liquid component, and measurement by the spectrometer of the intensity of said light after travel of said light along said light path and through said pure unmixed volume of said liquid component, thereby obtaining a liquid-blank light intensity measurement ($I_w$) from the spectrometer;

(iii) a subject measurement step comprising transmission of light by said light source along said light path during occupancy of said light path by the subject liquid, and measurement by the spectrometer of the intensity of said light after travel along said light path and through said subject liquid, thereby obtaining a subject light intensity measurement ($I_s$) from the spectrometer;

(c) using said liquid-absent light intensity measurement ($I_e$), said liquid-blank light intensity measurement ($I_w$), and said subject light intensity $I_s$ measurement, calculation by the one or more computing devices of both a volume concentration of the liquid component in said subject liquid, and a liquid-corrected light intensity ($I_{wc}$); and (d) using said liquid-absent light intensity measurement $I_e$ and said liquid-corrected light intensity ($I_{wc}$), calculation by the one or more computing devices of a color measurement of the subject liquid.

5. A testing method for determining contents of liquids, said method comprising:

(a) obtaining a subject liquid composed of multiple substances, at least one of which is a liquid component whose concentration is to be measured;

(b) using a testing apparatus comprising a light source for transmitting light through said subject liquid along a light path of known length (L) therethrough, a spectrometer operable to measure an intensity of the light after travel thereof through said subject liquid on said light path, and one or more computing devices connected to said spectrometer to receive light intensity measurements therefrom, performing the following steps:

(i) a liquid-absent measurement step comprising transmission of light along said light path in absence of any liquid substance, and measurement by the spectrometer of the intensity of said light after travel of said light along said light path in said absence of any liquid substance, thereby obtaining an liquid-absent light intensity measurement ($I_e$) from the spectrometer;

(ii) a liquid-blank measurement step comprising transmission of light by said light source along said light path during occupancy of said light path by a pure unmixed volume of said liquid component, and measurement by the spectrometer of the intensity of said light after travel of said light along said light path and through said pure unmixed volume of said liquid component, thereby obtaining a liquid-blank light intensity measurement ($I_w$) from the spectrometer:

(iii) a subject measurement step comprising transmission of light by said light source along said light path during occupancy of said light path by the subject liquid, and measurement by the spectrometer of the intensity of said light after travel along said light path and through said subject liquid, thereby obtaining a subject light intensity measurement ($I_s$) from the spectrometer;

(c) using said liquid-absent light intensity measurement ($I_e$), said liquid-blank light intensity measurement ($I_w$), and said subject light intensity $I_s$ measurement, calculation by the one or more computing devices of both a volume concentration of the liquid component in said subject liquid, and a liquid-corrected light intensity ($I_{wc}$); and (d) determining a turbidity of the subject liquid by:

calculation by the one or more computing devices of a pure-solvent optical density ($OD_0$) using the liquid-blank light intensity measurement ($I_w$) and the liquid-absent light intensity measurement ($I_e$);

calculation by the one or more computing devices of a subject optical density ($OD_s$) using the subject light intensity measurement ($I_s$) and the liquid-absent light intensity measurement ($I_e$);

conversion by the one or more computing devices of the pure-solvent optical density ($OD_0$) and subject optical density ($OD_s$) to logarithmic wavelength scale, plotting by the one or more computing devices of plots of the pure-solvent optical density ($OD_0$) and the subject optical density ($OD_s$) in said logarithmic wavelength scale, and calculation by the one or more computing devices of at least one of either a slope difference (Δ Slope) and an intersection difference (Δ Int) between said plots of the pure-solvent optical density ($OD_0$) and the subject optical density ($OD_s$) in said logarithmic wavelength scale and in a wavelength range (WLR) in which optical density is attributable only to light scattering; and calculating turbidity of the subject liquid using either said slope difference (Δ Slope) or said intersection difference (Δ Int).

6. A testing method for determining contents of liquids, said method comprising:

(a) obtaining a subject liquid composed of multiple substances, at least one of which is a liquid component whose concentration is to be measured;

(b) using a testing apparatus comprising a light source for transmitting light through said subject liquid along a light path of known length (L) therethrough, a spectrometer operable to measure an intensity of the light after travel thereof through said subject liquid on said light path, and one or more computing devices connected to said spectrometer to receive light intensity measurements therefrom, performing the following steps:

(i) a liquid-absent measurement step comprising transmission of light along said light path in absence of any liquid substance, and measurement by the spectrometer of the intensity of said light after travel of said light along said light path in said absence of any liquid substance, thereby obtaining an liquid-absent light intensity measurement ($I_e$) from the spectrometer;

(ii) a liquid-blank measurement step comprising transmission of light by said light source along said light path during occupancy of said light path by a pure unmixed volume of said liquid component, and measurement by the spectrometer of the intensity of said light after travel of said light along said light path and through said pure unmixed volume of said liquid component, thereby obtaining a liquid-blank light intensity measurement ($I_w$) from the spectrometer;

(iii) a subject measurement step comprising transmission of light by said light source along said light path during occupancy of said light path by the subject liquid, and measurement by the spectrometer of the intensity of said light after travel along said light path and through said subject liquid, thereby obtaining a subject light intensity measurement ($I_s$) from the spectrometer; and (c) using said liquid-absent light intensity measurement ($I_e$), said liquid-blank light intensity measurement ($I_w$), and said subject light intensity $I_s$ measurement, calculation by the one or more computing devices of both a volume concentration of the liquid component in said subject liquid, and a liquid-corrected light intensity ($I_{wc}$);

wherein step (c) comprises plotting by the one or more computing devices of a pure-solvent optical density spectrum plot ($A_{we}$) in a wavelength range WLR in which optical density is attributable to light scattering, calculation by the one or more computing devices of: a slope ($SLP_{we}$) and intercept ($INT_{we}$) of said pure-solvent optical density spectrum plot, a corrected pure-solvent optical density spectrum ($OD_{we\text{-}corr}$), where $OD_{we\text{-}corr}(\lambda)=A_{we}(\lambda)-(SLP_{we}\times\lambda+INT_{we})$, and the volume concentration of solvent [Sol], where $[Sol]=100\times A_{se}(\lambda)/OD_{we\text{-}corr}(\lambda)$, or $[Sol]=100\times A'_{se}(\lambda)/OD'_{we\text{-}corr}(\lambda)$, and $A_{se}(\lambda)=-\log_{10}\{I_s(\lambda)/I_e(\lambda)\}$.

7. The testing method of claim 2 wherein step (d) comprises plotting by the one or more computing devices of: an optical density spectrum plot (Asw) in a wavelength range WLR for light scattering correction, a slope ($SLP_{sw}$) and intercept ($INT_{sw}$) of said subject optical density spectrum plot, a corrected subject optical density spectrum ($OD_{sw\text{-}corr}$), where $OD_{sw\text{-}corr}(\lambda)=A_{sw}(\lambda)-(SLP_{sw}\times\lambda+INT_{sw})$, and the volume concentration of alcohol [Alc], where $[Alc]=dOD_{sw\text{-}corr}(\lambda)/\{d_\varepsilon(\lambda_0)*L\}$, or $[Alc]=OD_{sw\text{-}corr}(\lambda)/\{\varepsilon(\lambda_0)*L\}$, and ε is a calibration-derived extinction coefficient of alcohol.

8. The testing method of claim 5 wherein the subject measurement step (a)(iii) is performed as an in-situ measurement within a reaction mixture during production of a liquid product.

* * * * *